United States Patent Office

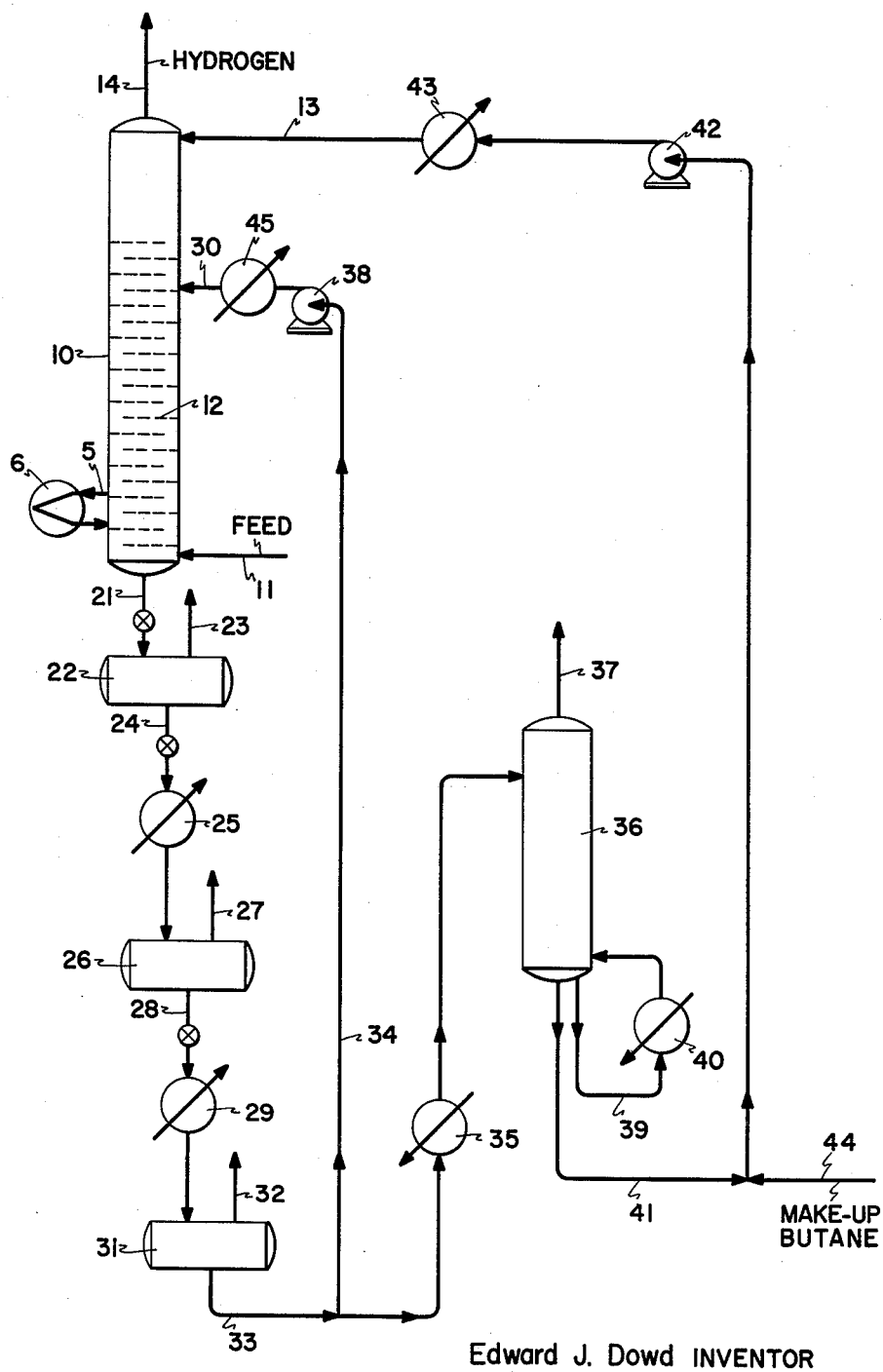

3,102,012
Patented Aug. 27, 1963

3,102,012
PROCESS FOR PURIFICATION OF HYDROGEN
Edward J. Dowd, New Providence, N.J., assignor to Esso Research and Engineering Company, a corporation of Delaware
Filed July 27, 1959, Ser. No. 829,621
8 Claims. (Cl. 55—23)

The present invention relates to the separation of hydrogen from other components in a gaseous stream. More specifically it concerns the separation of hydrogen from light hydrocarbons, such as methane, and its purification.

Several streams in present day petroleum refineries are rich in hydrogen, which in the pure state, is useful in the synthesis of ammonia and the hydrogenation of edible fats and oils. The effluent streams from catalytic crackers, reformers and steam crackers are excellent sources of hydrogen since they generally contain at least 10 mole percent of that chemical and in many instances the streams contain 30, 40 and even 70 mole percent hydrogen. Heretofore, hydrogen in such streams has been concentrated by contacting the gaseous charge containing hydrogen and low molecular weight hydrocarbons with a liquid hydrocarbon absorbent, such as heavy naphtha at pressures of 1000 p.s.i.a. and temperatures of 25–100° F. The hydrocarbons, such as methane and ethane, are selectively absorbed by the naphtha flowing down the absorber tower, withdrawn from the bottom of the tower in admixture with the naphtha and thereafter separated from the absorbent in a fractionating zone. The hydrogen which is about 90–95% pure is taken off overhead from the tower. This process, while suitable for the isolating of substantially pure hydrogen, is not satisfactory for the preparation of high purity hydrogen needed for certain hydrogenation reactions.

Other processes involve the use of very light absorbents at extremely low temperatures, e.g. −340° F. These methods pose difficult problems, such as separation of the absorbent from the methane and the need for considerable refrigeration, which make them less commercially attractive. If higher temperatures are used the hydrogen product is seriously contaminated with the absorbent.

It is an object of this invention to provide a simple process for separating high purity hydrogen and methane from a mixture containing substantially hydrogen and methane at moderately low temperatures. Other objects of the invention will become evident from the description of the invention as hereinafter set forth.

In accordance with the present invention, high purity hydrogen and methane are isolated from a gaseous stream containing hydrogen and light hydrocarbons by contacting the stream with a $C_4$ to $C_5$ hydrocarbon absorbent at low temperatures, e.g. −100° F. or lower and superatmospheric pressures. Hydrogen having a purity of more than 95 mole percent is easily obtained from a dry or predried hydrocarbon-rich stream by intimately admixing the stream with a saturated or unsaturated $C_4$ to $C_5$ hydrocarbon at a temperature between about −110 and −200° F. under a pressure of about 50 to 1000 p.s.i.a. Because the temperatures in the absorption zone are quite low, it is important to maintain the water content in the feed stream below about 10 p.p.m. and preferably less than 1 p.p.m. Water in excess of the former amount will cause icing in the absorber tower and eventually make it necessary to shut down the separation unit. Feeds containing significant amounts of water must be predried to remove excess water. This can easily and advantageously be accomplished by passing the stream through a bed of bauxite or alumina.

Internal cooling is desirable for most feeds. For example, a portion of the liquid may be withdrawn from a tray in the absorber tower, cooled with liquid ethylene and returned to the tower on the next lower tray. However, in some cases where the amount of material to be absorbed is small, e.g. less than 20 mole percent, the use of a cold feed, which has been cooled to a temperature within a few degrees of the selected absorbing temperature, is adequate to permit the desired thermal control in the absorber tower.

The invention is specifically illustrated in the accompanying drawing which is a diagrammatic flow sheet of one embodiment of the invention.

The gaseous mixture which is separated in accordance with the invention should contain a substantial amount of hydrogen, that is to say at least about 5 mole percent, preferably not less than about 20 mole percent. The other components in the mixture may be $C_1$ to $C_6$ saturated or unsaturated hydrocarbons. The hydrogen recovered by this process has a purity exceeding 99 mole percent if the feed stream is free of nitrogen, oxygen and carbon monoxide. A purity of 99.9+ mole percent can be achieved by further processing the hydrogen effluent with molecular sieves. For instance, 99.5 mole percent hydrogen taken overhead from the absorber may be charged to a demethanizer or molecular sieve unit for final clean-up. The temperature and pressure of the hydrogen leaving the absorber are highly suitable for treatment with molecular sieves. A portion of the methane gas recovered from the rich absorbent liquid may be used to regenate the sieves at approximately ambient temperatures and pressures which are slightly in excess of atmospheric pressure, e.g. 40 p.s.i.g.

In a preferred embodiment of the invention, the demethanizer overhead stream in a steam cracking unit is fed directly to the absorption zone. This stream is at optimum conditions for the separation, that is to say, about −130 to −150° F. and under 300 to 600 p.s.i.a. pressure, and therefore it is not necessary to precool or pressurize the stream. The general composition of such a stream is given below:

*Composition of Demethanizer Overhead in Steam Cracking Operation*

| Components: | Mole percent |
|---|---|
| Hydrogen | 30–35 |
| Methane | 65–70 |
| Ethylene | 0.5–2 |
| Propylene | 0.5–2 |

Trace amounts of other substances, e.g. <1 p.p.m. water, not included above may also be present in the overhead stream. The ratio of absorbent to feed in the absorber will vary depending on the hydrogen purity desired, the temperature and pressure in the absorber and the feed composition. However, it will be found that for most purposes it is advantageous to maintain the absorbent to feed ratio between about 0.5 to 2 moles of absorbent per mole of feed. The preferred ratio of absorbent to feed is approximately mole per mole. The feed is introduced to the absorber tower, near the bottom or at a higher point if stripping is desired, and immediately contacts the downflowing or counterflowing $C_4$ to $C_5$ hydrocarbon absorbent. The lean hydrocarbon absorbent, which may be a mixture of $C_4$ and $C_5$ hydrocarbons, is introduced into the absorber near the top of the tower and flows countercurrently over trays or through packing and is withdrawn from the bottom of the absorber tower rich with the hydrocarbons in the feed. The packing or other structures in the tower serve to promote a closer contact between the feed and the absorbent. Pure hydrogen (up to 99.8 mole percent) gas is withdrawn overhead from the absorber tower and as mentioned above, may be further purified to obtain practically 100% pure hydrogen.

The absorbent oil employed in this process must have a high enough F.P. not to "freeze" in the tower, yet have a low enough volatility so as not to contaminate the hydrogen withdrawn overhead from the absorber tower. These critical properties restrict the absorbents to $C_4$ to $C_5$ hydrocarbons, such as butane, isopentane, and butene-1. These low molecular weight hydrocarbons, especially the $C_4$ hydrocarbons, isolate hydrogen of such a high purity that it is not necessary to clean up the product except where it must be completely free of impurities. For example, a butane absorbent oil will produce 99.8 mole percent hydrogen under the preferred conditions of the process.

The absorber tower is more efficient at lower temperatures and therefore its lean oil requirement is less at such temperatures for equivalent purity. For example, to make hydrogen having a purity of 99.5 mole percent at −120° F., it is necessary to employ about 1.5 times as much lean oil as is necessary to obtain the same purity hydrogen at −140° F. However, the quantity of lean oil required at higher temperatures may be reduced by utilizing higher pressures, e.g. 1000 p.s.i.a. From the foregoing it is apparent that the conditions should be regulated by the operator in accordance with the heat exchangers, compressors and other equipment available to him to make the desired purity hydrogen.

The rich absorbent oil or "fat" oil withdrawn from the bottom of the absorber may be fractionated to recover lean absorbent oil and substantially pure methane, ethylene, etc. If small losses of lean oil can be tolerated, it may be advantageous to flash or strip the lighter hydrocarbons from the rich oil. In any event, the lean oil is recycled to the middle and/or upper portion of the absorber tower through a heat exchanger which cools the absorbent to a temperature which is substantially the same as the temperature of the absorber tower, i.e. −100° F. or lower.

Referring now to the drawing, a gaseous stream withdrawn as overhead product from a demethanizer in a steam cracking operation containing 32 mole percent hydrogen, 67 mole percent methane and 0.5 mole percent ethylene and propylene is charged to the absorber tower 10 through line 11 at the rate of about 1150 moles/hour. The stream which is rich in hydrogen flows upwardly through the absorber tower 10 passing over packing or trays 12 in said tower and simultaneously contacting butane which is continuously introduced near the middle and top of tower 10 through lines 30 and 13, respectively. The hydrocarbon-rich feed stream and lean liquid butane absorbent are at −140° F. and under about 400 p.s.i.a pressure. The temperature in tower 10 is maintained by withdrawing a part of the liquid through line 5, cooling it in cooler 6 with liquid ethylene and returning it to said tower via said line. The feed and total absorbent introduced into tower 10 are in a 1:1 molar relationship with each other. The overhead product is withdrawn through line 14 at the top of tower 10 at a rate of about 350 moles/hour and contains 99.5 mole percent hydrogen. This product may be further purified by passing it through a tower (not shown) which contains crystalline porous (5 A.) sodium zeolite in a finely divided form.

The rich absorbent oil or "fat" oil is withdrawn from the bottom of tower 10 through line 21 and depressurized to 185 p.s.i.a. before it is introduced into flash drum 22. About 150 moles/hour of fuel gas (mostly methane) are taken off overhead through line 23 at about −139° F. and the bottoms portion is withdrawn through line 24 and depressurized further before it is passed through heat exchanger 25 and introduced in a second flash drum 26 which is maintained at 115 p.s.i.a. The overhead product in line 27, which comprises about 210 moles/hour of 99.5 mole percent methane, is at about −147° F. The bottoms are withdrawn through line 28, depressurized and passed through heat exchanger 29 before introducing the bottoms into flash drum 31 which is at 50 p.s.i.a. The overhead product withdrawn through line 32 comprises mainly methane (370 moles/hour) with some butane mixed with it. About one-half of the bottoms (550 moles/hour of butane) withdrawn from drum 31 through line 33 is pumped through line 34 by pump 38, cooled to −140° F. by means of cooler 45 and recycled to the tower 10. This recycle stream contains some methane. The other half of the bottoms stream in line 33 is passed through a heat exchanger 35 to raise its temperature to −40° F. and introduced near the top of stripper 36 which is maintained at 250 p.s.i.a. The methane is continuously stripped off at the rate of about 55 moles/hour through line 37. There is some loss of butane (2.5 moles/hour) in this stripping step. Part of the absorbent in the bottom of stripper 36 is withdrawn through line 39, reboiled in a steam heat exchanger 40 and reintroduced into the stripper near the bottom. The stripped absorbent or lean oil, which is at 200° F., is cooled in cooler 43 to −150° F. in line 41 and recycled to the top of the absorber tower 10 by means of pump 42. Make-up butane is introduced into line 41 through line 44 at the rate of 4 moles/hour.

It is understood, of course, that the invention is not restricted to the foregoing embodiment and that the apparatus may be arranged in other ways. The essence of the invention is the use of an absorbent having peculiar properties to permit the recovery of high purity hydrogen and methane (99 mole percent or higher) from a refinery stream. When this process is combined with other purification techniques, such as the use of molecular sieves, almost pure hydrogen is prepared.

While the methane recovery steps described herein involve a series of successive flashings at pressures, e.g. 50 to 185 p.s.i.a., which are substantially lower than the pressure in the absorption zone, pure methane may also be recovered by increasing the temperature of the rich absorbent to selectively remove the methane. Moreover, while there are three flash drums used in the described process, the first for the removal of any hydrogen that may be in the rich absorbent, the second to recover pure methane and the third to clean up the absorbent for recycle to the middle of the absorption zone, more or fewer than this number of drums may be used.

What is claimed is:

1. A method for separating hydrogen and methane in a gaseous mixture containing mainly hydrogen and methane which comprises feeding the gaseous mixture into an absorption zone, passing the mixture upwardly countercurrent to a liquid $C_4$ to $C_5$ hydrocarbon absorbent at an absorbent to feed ratio of between about 0.5 to 2.0 moles of absorbent per mole of feed, said absorption zone being at a temperature of −110° to −200° F. and under a pressure of 50 to 1000 p.s.i.a., correlating the temperature, pressure and absorbent/feed ratio within the ranges specified so that the gaseous stream withdrawn from the upper part of said absorption zone contains at least 99 mole percent hydrogen, withdrawing said absorbent containing methane from the bottom of said absorption zone, reducing the pressure on said withdrawn absorbent, flashing a minor part of the methane from said withdrawn absorbent, at substantially the temperature of the absorption zone, separating a fuel gas containing mostly methane from the partially depressured absorbent, further reducing the pressure on the partially depressured absorbent liquid, discharging the depressured absorbent liquid into a flashing zone, withdrawing a gaseous stream containing at least 99 mole percent methane overhead from said flashing zone, withdrawing absorbent liquid containing residual methane from said flashing zone, compressing and cooling and recycling a portion of the last mentioned liquid to the middle of the absorption zone, stripping the residual methane from the remainder of the said absorbent liquid at a temperature which is higher than that of said absorption zone, cooling the stripped absorbent to −110° to −200° F. and recycling the cooled, stripped absorbent to the upper part of the absorption zone.

2. A method according to claim 1 in which the absorption zone is maintained at about 400 p.s.i.a., the withdrawn absorbent liquid is depressured in the first stage to about 185 p.s.i.a. and the absorbent liquid is then depressured to about 115 p.s.i.a. in the second stage from which the gaseous stream containing at least 99 mole percent methane is removed.

3. A method according to claim 1 in which the absorbent is butane.

4. A method according to claim 1 in which the absorbent is pentane.

5. A method according to claim 1 in which the absorbent is a mixture of $C_4$ and $C_5$ hydrocarbons.

6. A method for separating hydrogen and methane in a gaseous mixture containing about 20 to 70 mole percent hydrogen and a substantial amount of methane which comprises feeding the gaseous mixture into an absorption zone, passing the mixture upwardly countercurrent to a liquefied $C_4$ hydrocarbon absorbent at an absorbent to feed ratio of between about 0.5 to 2.0 moles of absorbent per mole of feed, said zone being at a temperature of −130° to −150° F. and under a pressure of 300 to 600 p.s.i.a., correlating the temperature, pressure and absorbent/feed ratio within the ranges specified so that the gaseous stream withdrawn from the top of said zone contains at least 99 mole percent hydrogen, withdrawing from the bottom of said absorption zone said absorbent containing methane, partially reducing the pressure on the withdrawn absorbent, flashing a minor part of the methane from the partially depressured absorbent at substantially the temperature of the absorption zone, separating a fuel gas containing mostly methane from the partially depressured absorbent, further reducing the pressure on the partially depressured absorbent liquid, and discharging the liquid into a flashing zone, withdrawing a gaseous stream containing at least 99 mole percent methane from said flashing zone, withdrawing absorbent liquid containing residual methane from said flashing zone, compressing and cooling a portion of the absorbent liquid containing residual methane to about absorption zone conditions and recycling the same to the middle of the absorption zone, stripping the residual methane from the remainder of said absorbent liquid at a temperature which is higher than that of said absorption zone, cooling the stripped absorbent to about −130° to −150° F. and recycling the cooled absorbent to the upper part of said absorption zone.

7. A process according to claim 6 in which the liquefied $C_4$ hydrocarbon absorbent is butane.

8. A method for separating hydrogen and methane from a gaseous mixture thereof which comprises feeding the demethanizer overhead stream from a steam cracking unit comprising from about 30 to 35 mole percent hydrogen and from about 65 to 70 mole percent methane into an absorption zone maintained at a temperature of between about −130° F. and −150° F. and at a pressure of between about 300 to 600 p.s.i.a., passing the stream upwardly countercurrent to liquefied butane absorbent at an absorbent to feed ratio of between about 0.5 to 2.0 moles of butane per mole of feed, correlating the temperature, pressure and butane absorbent/feed ratio within the ranges specified so that the gaseous stream withdrawn from the top of said zone contains at least 99 mole percent hydrogen, withdrawing from the bottom of said absorption zone said absorbent containing methane, reducing the pressure on the withdrawn absorbent, flashing a minor portion of the methane from the partially depressured absorbent at substantially the temperature of the absorption zone, separating a fuel gas containing mostly methane from the partially depressured absorbent, further reducing the pressure on the partially depressured absorbent liquid and discharging the liquid into a flashing zone, withdrawing a gaseous stream containing at least 99 mole percent methane from said flashing zone, withdrawing liquefied butane absorbent containing residual methane from said flashing zone, compressing and cooling a portion of said liquefied butane containing residual methane to about absorption zone conditions and recycling the same to the middle of the absorption zone, stripping the residual methane from the remainder of said liquefied butane at a temperature which is higher than that of said absorption zone, cooling the stripped liquefied butane to about the temperature of the absorption zone and recycling the cooled liquid butane to the upper part of said absorption zone.

References Cited in the file of this patent

UNITED STATES PATENTS

| | | |
|---|---|---|
| 2,299,830 | Legatski et al. | Oct. 27, 1942 |
| 2,516,507 | Deming | July 25, 1950 |
| 2,582,443 | Linn | Jan. 15, 1952 |
| 2,685,941 | Kassel | Aug. 10, 1954 |
| 2,689,624 | Davis | Sept. 21, 1954 |
| 2,857,018 | Partridge | Oct. 21, 1958 |
| 2,887,850 | Adams | May 26, 1959 |